Jan. 24, 1967    G. RESTALL    3,299,979
POWER COUPLINGS
Filed June 30, 1964    5 Sheets-Sheet 1

George Restall
BY Scrivener Parker Scrivener & Clarke

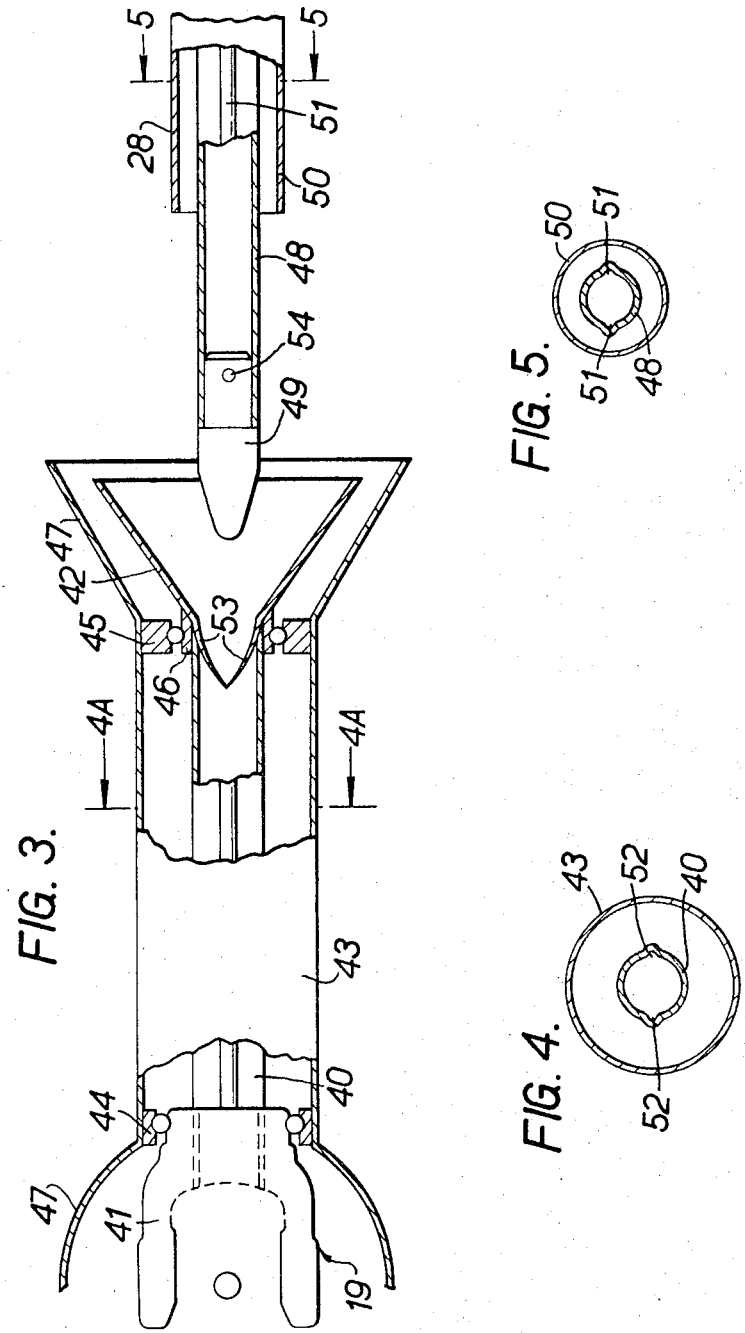

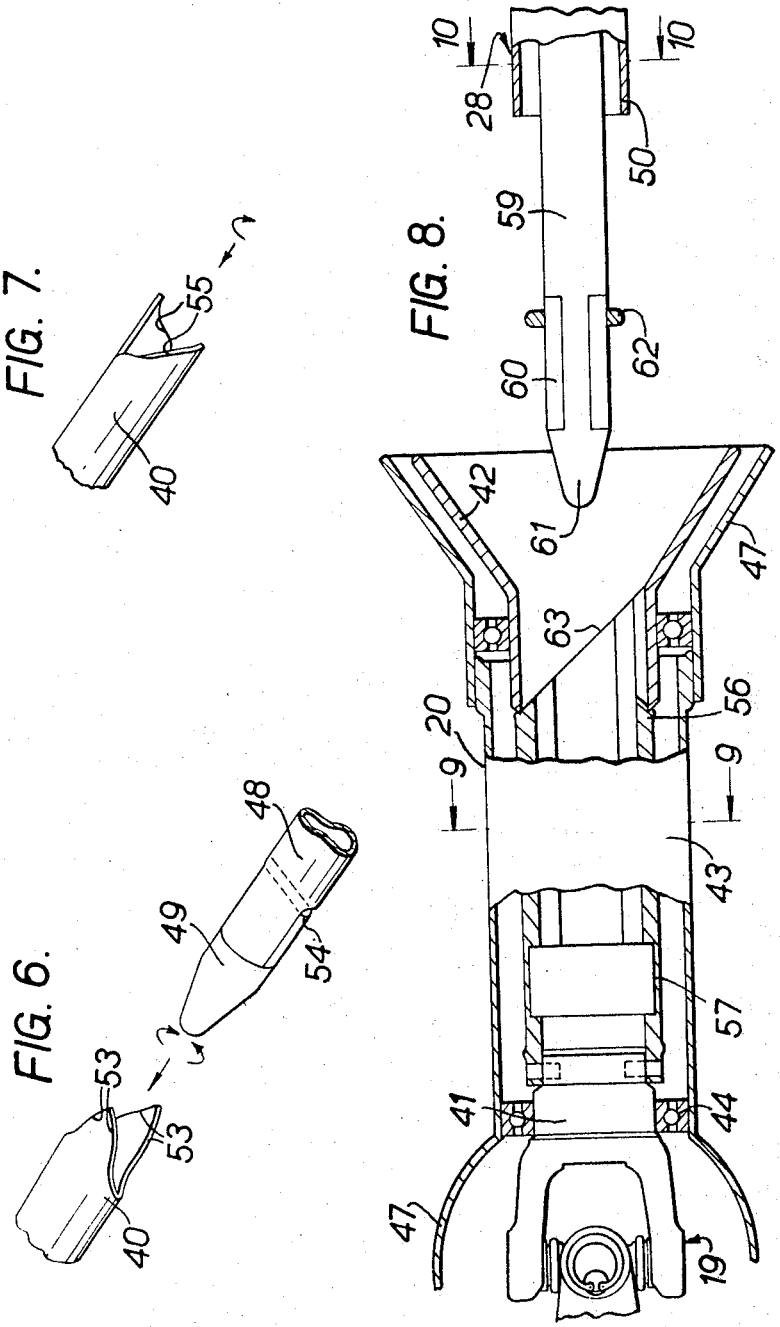

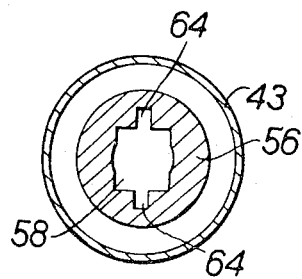
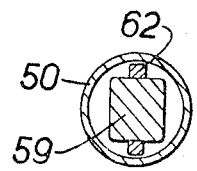
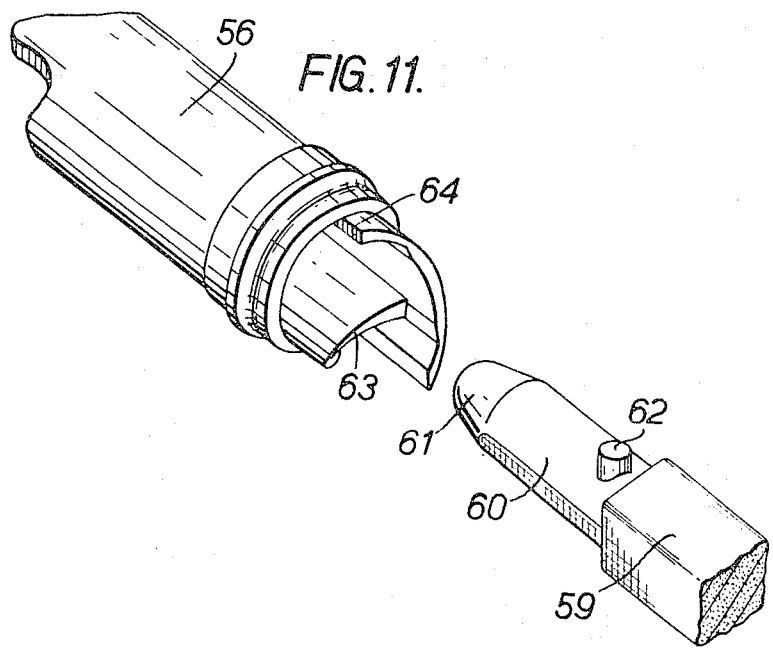

Jan. 24, 1967　　　　　　G. RESTALL　　　　　　3,299,979
POWER COUPLINGS
Filed June 30, 1964　　　　　　　　　　　　　　5 Sheets-Sheet 5
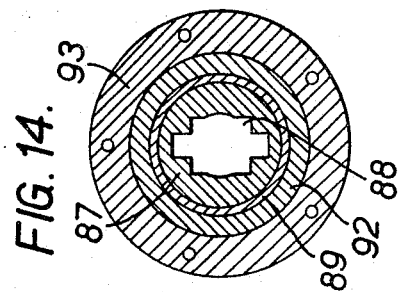
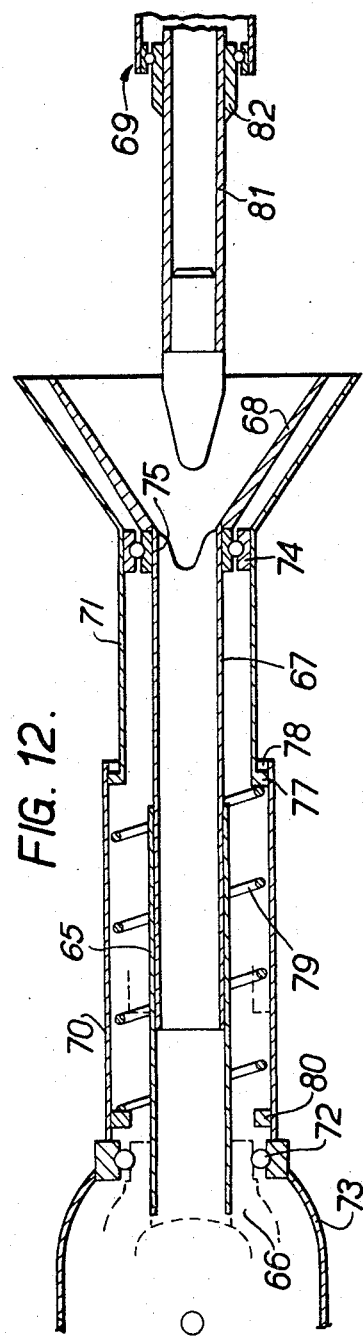
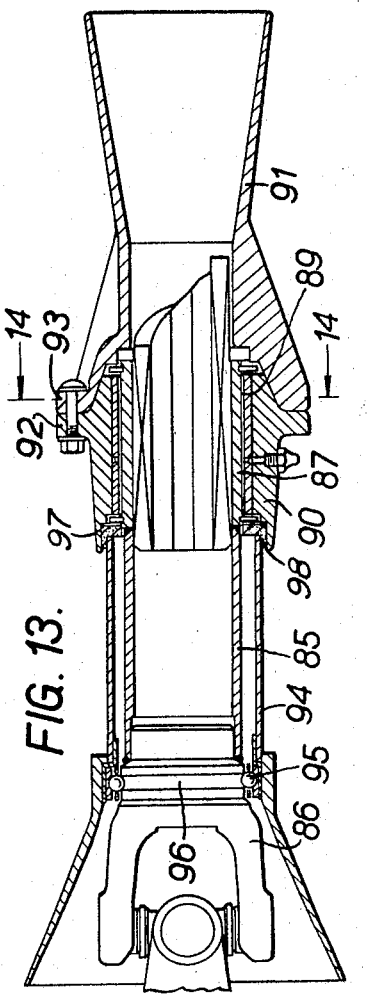
George Restall
By Scrivener Parker Scrivener + Clarke

United States Patent Office 3,299,979
Patented Jan. 24, 1967

3,299,979
POWER COUPLINGS
George Restall, Sutton Coldfield, England, assignor to Rubery, Owen and Company Limited, Darlaston, England, a British company
Filed June 30, 1964, Ser. No. 379,206
8 Claims. (Cl. 180—14)

This invention relates to power couplings and more particularly to a power coupling of the kind for the transmission of power between a power take-off shaft of a tractor, and a power drive shaft of an implement adapted to be hitched to the tractor in which the power coupling is auomatically engaged substantially concurrently or simultaneously upon hitching the implement to the tractor.

According to our invention, a power coupling of the kind set forth comprises a first shaft assembly adapted to be connected to the power take-off shaft of the tractor through a first universal joint, a second shaft assembly for slidable coupling engagement with the first shaft and adapted to be connected to the power drive shaft of the implement through a second universal joint, means for maintaining both shaft assemblies substantially in alignment with the power take-off and power drive shafts prior to their engagement, and of which at least one of the shaft assemblies is suspended by resilient means from the tractor or implement or a member carried by the tractor or implement, and means carried by one of the shaft assemblies for guiding the other shaft assembly automatically into sliding axial engagement with it substantially simultaneously or concurrently upon hitching the implement to the tractor.

Figure 1:
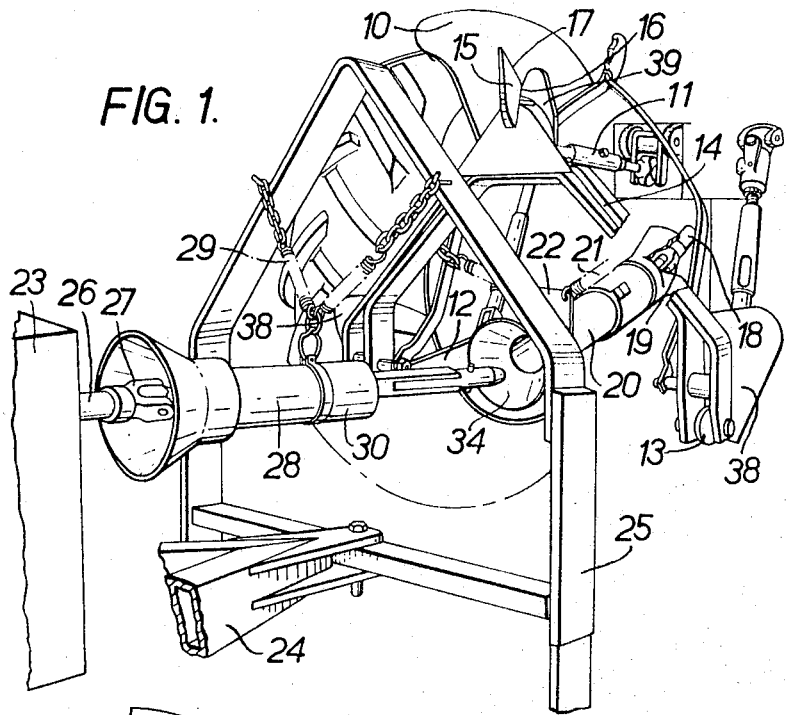
Figure 2:
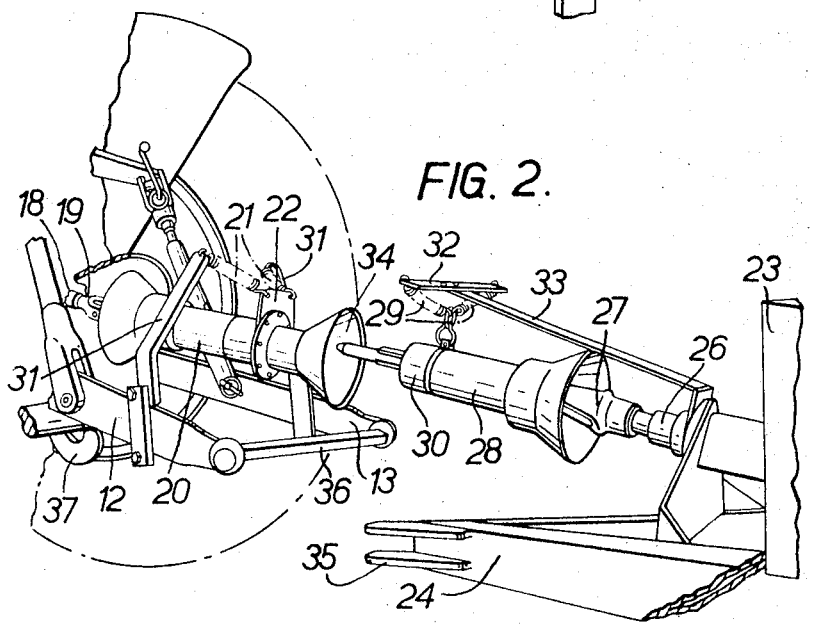

Some embodiments of tractor implement arrangements and shaft assemblies for use therewith are shown in the accompanying drawings in which:

FIGURE 1 is one form of tractor implement arrangement prior to hitching;
FIGURE 2 is another form of tractor implement arrangement prior to hitching;
FIGURE 3 is a longitudinal section of one form of the shaft assemblies for use in arrangements shown in FIGURE 1 or FIGURE 2;
FIGURE 4 is a section on the line 4—4 of FIGURE 3;
FIGURE 5 is a section on the line 5—5 of FIGURE 3;
FIGURE 6 is a perspective view, in one embodiment of adjacent ends of the shaft assemblies of FIGURE 3 prior to their engagement;
FIGURE 7 is a perspective view of another embodiment of the end of the tractor shaft assembly of FIGURE 3;
FIGURE 8 is a longitudinal section of another form of the shaft assemblies for use in the arrangement shown in FIGURE 1 or FIGURE 2;
FIGURE 9 is a section on the line 9—9 of FIGURE 8;
FIGURE 10 is a section on the line 10—10 of FIGURE 8;
FIGURE 11 is a perspective view of the adjacent ends of the shaft assemblies of FIGURE 8;
FIGURE 12 is a longitudinal section of another form of the shaft assemblies for use in the arrangements shown in FIGURE 1 or FIGURE 2;
FIGURE 13 is a longitudinal section of a modified tractor shaft assembly for use in the arrangement shown in FIGURE 1 or FIGURE 2; and
FIGURE 14 is a section on the line 14—14 of FIGURE 13.

In the arrangement shown in FIGURE 1, 10 is a tractor having a power lift comprising three rearwardly extending draft links 11, 12, 13 of which the lower links 12, 13 can be raised and lowered by power means on the tractor, and the upper draft link 11 is adjustable in length. A hitch frame 14 of substantially inverted U or V outline is pivotally connected at or adjacent the free ends of its limbs to the outer ends of the lower draft links and at or adjacent its apex to the outer end of the upper draft link whose length is adjusted so that the frame is maintained in a substantially vertical plane.

Integral with or welded to the outer face of the frame at its apex there is an upwardly extending hook member 15 which projects rearwardly from the other portions of the frame. The hook has an upwardly extending vertical edge 16 immediately adjacent the limbs of the frame and a rearwardly inclined edge 17 leading from the vertical edge 16, and extending to the top of the hook.

The tractor has a rearwardly extending power take-off shaft 18 to which is connected through a universal joint 19 a shaft assembly 20 which is suspended from the hitch frame 14 by a pair of springs 21 connected between a plate 22 mounted on the shaft assembly adjacent to its outer end and the limbs of the hitch frame 14 at intermediate points in their lengths. The shaft assembly is angularly movable about its universal joint by operation of the power means of the tractor which raise or lower the hitch frame.

An implement 23 to be hitched to the tractor has mounted on the outer end of a tow bar 24 a substantially vertical hitch frame 25 of substantially inverted U or V outline for co-operation with the frame 14 on the tractor when the tractor and implement are hitched together. The implement above its tow bar 24 has a forwardly extending power drive shaft 26 to which is connected through a universal joint 27 a shaft assembly 28 suspended from the hitch frame 25 and held in a substantially horizontal position by a pair of springs 29 connected between a band 30 encircling the shaft assembly at an intermediate point in its length and the limbs of the frame 25 at intermediate points in their lengths.

For hitching the tractor to the implement and simultaneously coupling the shaft assemblies for transmitting power from the tractor to the implement the height of the tractor hitch frame 14 is adjusted until the outer end of its shaft assembly is generally in alignment with the outer end of the shaft assembly 28 on the implement. The tractor is then reversed and the forward end of the shaft assembly 28 enters an axial bore in the tractor shaft assembly 20, the engagement being facilitated by a frusto-conical sleeve 34 on the outer end of the shaft assembly 20 which serves as a guide when the two shaft assemblies are not in exact alignment. The construction and precise method of engagement of the shaft assemblies for power transmission is described below.

The suspension springs permit either or both shaft assemblies to be moved angularly about their universal joints to permit engagement of the shafts. When the shaft assemblies are engaged so that they are substantially rigid the height of the hitch frame 14 on the tractor is adjusted so that upon further movement of the tractor in the reverse direction the frame 14 can enter the frame 25 on the implement. By raising the tractor hitch frame 14 the apex of the hitch frame 25 is located between the vertical edge of the hook 15 and an upwardly extending vertical plate 39 integral with or welded to the rear face of the tractor hitch frame 14 at its apex. Simultaneously, the forward faces of the implement frame at the lower ends of its downwardly diverging limbs abut against outwardly projecting plates or lugs 38 integral with or welded to the rear face of tractor hitch frame 14 at or adjacent to the free ends of its limbs. The frames at their lower ends are locked together by means operated by the driver of the tractor when seated on the tractor.

It will be appreciated that both the hitching and power coupling operations described above take place automatically and concurrently. They are affected solely by the driver of the tractor from the tractor seat and do not require the assistance of other personnel.

In FIGURE 2 there is illustrated an arrangement for hitching an implement to a tractor and substantially simultaneously or concurrently coupling shaft assemblies for power transmission where the tractor and implement are not provided with hitch frames.

The arrangement of the shaft assemblies is substantially the same as described above with reference to FIGURE 1 and corresponding reference numerals have been used where appropriate to indicate corresponding parts. However in this arrangement the outer ends of the springs 21 which suspend the tractor shaft assembly 20 are attached to the upper ends of a pair of arms 31 of which the arms at their lower ends are clamped to the lower draft links 12 and 13 of the tractor. Similarly, the springs 29 which suspend the implement shaft assembly 28 are attached to the outer ends of a transverse arm 32 mounted on the outer end of a forwardly extending arm 33 which is secured at its inner end to the structure of the implement.

For hitching the implement to the tractor and coupling the shaft assemblies, the height of the tractor's shaft assembly 20 is adjusted by adjusting the height of the lower draft links 12 and 13 until the shaft assembly 20 at its outer end is generally in alignment with the outer end of the shaft assembly 28 on the implement. The tractor is then reversed up to the implement and the forward end of the shaft assembly 28 enters the axial bore in the shaft assembly 20 as described above. The implement is then hitched to the tractor by the manual engagement of a bifurcated fitting 35 at the forward end of its tow bar 24 with a tow bar 36 connected between the lower draft links 11 and 12 of the tractor.

In another arrangement where the implement tow bar is of larger length and has at its outer end a clevis ring, the implement is hitched to the tractor by the engagement of the clevis ring with a hook 37 on the fixed structure of the tractor below its power take-off shaft 18.

It will be appreciated that the implement described in FIGURE 2 can be readily hitched to a tractor as shown in FIGURE 1 on which is mounted a hitch frame of which the height is adjustable to effect alignment of the shaft assemblies for power coupling, the implement being hitched to a tow bar connected between the lower draft links or the hook as described above with reference to FIGURE 2.

The tractor and implement shaft assemblies 20 and 28 shown in FIGURES 1 and 2, may take various forms. One embodiment is illustrated in FIGURES 4–7 in which the tractor shaft assembly 20 comprises a hollow tube 40 of which the inner end is fixed in the half 41 of the universal joint 19 remote from the tractor and on its outer end is fixed a frusto-conical sleeve 42 forming the guide for the outer end of the implement shaft assembly 28. The tube is of a cross section other than circular and preferably it is of extruded "lemon" section as shown more particularly in FIGURE 4.

The tube is enclosed by an outer cylindrical sleeve 43 mounted at opposite ends on bearings 44 and 45. The bearing 44 is located between the inner end of the sleeve and an annular surface on the universal joint 41 and the bearing 45 is located between the outer end of the sleeve and an axial portion 46 integral with the sleeve 42, the axial portion 46 providing the mounting for the sleeve on the tube.

The shaft assembly is suspended from the sleeve 43 by the springs which hold the sleeve substantially stationary when the tube is rotated by the tractor power take-off shaft. The tube is thus fully protected by the sleeve against danger to personnel, and the universal joint and the guide sleeve 43 are also protected by opposed conical or semi-spherical guards 47 integral with the sleeve at both ends.

The implement shaft assembly 28 comprises a hollow tube 48 of the same section as the tube 40. The inner end of the tube 48 is fixed in the half of the universal joint remote from the implement and in the outer end of the tube is received a spigot 49 having a conical outer end.

The tube, apart from a portion at its outer end for engagement in the bore of the tube 40, is enclosed in an outer cylindrical protecting sleeve 50 having at its inner end a conical or semi-cylindrical guard for protecting the universal joint of the implement as shown in FIGURES 1 and 2. The tube is supported at both ends by bearings (not shown) in a similar manner to the tractor shaft assembly.

When the implement is being hitched to the tractor as described above and the outer end of the spigot 49 is received in the conical guide 42 on the tube 40 and the conical outer end on the spigot provides a gradual lead into the bore of the tube 40, serving to align the tubes to facilitate their engagement. Axial projections 51 on the outer surface of the wall of the tube 48 are then received in complementary recesses 52 in the inner surface of the wall of the tube 40. Upon completion of the hitching operation the tubes are held against relative axial movement and power can be transmitted from the power take-off shaft of the tractor to the power drive shaft of the implement.

The angular positions at which the tubes are fixed in the universal joints are chosen so that when the tubes are engaged the universal joints are in phase. To assist the coupling engagement of the tubes and to ensure correct phasing of the universal joints the tube 40 at its outer end is formed with a cam surface 53 with which cooperate the ends of a pin 54 fixed in the spigot 49 and the tube 48 to the outer end of its axial projections 51. The pin is located on a diameter of the tube on which lie the axial projections and is of substantially the same length or of slightly shorter length than the diametrical measurement of the tube 48 including the projections 51 so that its ends can slide with the recesses in the tube 40 upon engagement of the shaft assemblies.

The cam surfaces 53 are shown in greater detail in FIGURE 6 and are formed by chamfering the tube 40 on diametrically opposite sides of a diameter of the tube passing through the recesses 52.

When the spigot 49 enters the tube 40 and the projections 51 are not in exact alignment with the recesses 52 the pin 54 engages with diametrically opposite faces of the cam surfaces 51. As the tubes are moved further into engagement the pin slides over the cam surfaces and simultaneously the tube 48 is moved angularly in one direction until the pin enters the recesses in the tube 40. The tubes are then fully engaged by further movement of the tractor in the reverse direction in which the projections on the tube 50 are received in the recesses in the tube 40 as described above.

With this arrangement it will be appreciated that the angular movement of the tube 48 required to bring the universal joints into phase takes place in either a clockwise or anticlockwise direction according to which pair of diametrically opposed cam surfaces are engaged by the pin 54. The angular movement of the tube 48 required to achieve phasing of the universal joints is in the range of 0–90°.

In an alternative arrangement the cam surfaces 53 may be of the form shown in FIGURE 7. As illustrated the cam surfaces are formed by two diametrically opposed inclined faces 55 of which the faces at their outer ends extend inwardly in opposite directions from the centres of the recesses on opposite sides of the tube and terminate at the centres of their opposite recesses. The phasing of the tubes takes place in a similar manner to arrangement described in FIGURE 6 with the exception that the tube 48 is moved angularly only in a clockwise direction and through a possible range of 0–180°.

The construction and operation of the tractor and implement shaft assemblies illustrated in FIGURES 9–10, is substantially the same as the arrangement shown in FIGURES 3–5 and corresponding reference numerals have been used to indicate corresponding parts. However in this arrangement the tube 40 is replaced by a shaft 56 of which the inner end is received in a sleeve 57 secured at its outer end to the half 41 of the universal joint 19. The shaft 56 has a rectangular axial bore 58 adapted to receive a shaft 59 of the implement shaft assembly 28 which is of rectangular section. The outer end of the shaft 59 has a portion 60 of substantially circular cross-section of which the diameter corresponds substantially to the minimum width between opposite sides of the rectangular shaft. At its outer end the circular portion 60 has a conical outer end 61 to facilitate engagement of the shafts.

The engagement of the shafts assemblies upon hitching the implement to the tractor takes place as described above. To facilitate their engagement and ensure correct phasing of the universal joints a pin 62 for co-operation with cam surfaces 63 formed in the outer end of the shaft 56 is fixed in the circular portion 60 of the shaft 56 in a similar manner to the pin 54 in the embodiment of FIGURES 3–5. However in this arrangement the ends of the pin project above the opposite sides of the shaft of minimum width and are received in co-operating longitudinal slots 64 in the shaft 56 when the shafts are engaged.

The form of the cam surfaces 63 is illustrated in greater detail in FIGURE 11. Their construction and the method by which they co-operate with the pin is identical to the arrangement described with reference to FIGURE 7 and need not be further described herein.

In either of the shaft assemblies described above with reference to FIGURES 3–7 or FIGURES 8–11, the tractor shaft assembly 20 may be adjustable in length to permit the transmission of power between the power take-off shaft of the tractor and power-drive shafts of an implement where the lengths of the hitching means between the tractor and the implement are of different length. One embodiment of a tractor shaft assembly which is adjustable in length is illustrated in FIGURE 12. In this arrangement the tube or hollow shaft for transmitting power from the power take-off shaft to the shaft assembly of the implement is formed by two telescopic members of which 65 is a hollow sleeve secured at its inner end to the universal joint 66 of the tractor and which at its outer end slidably receives the inner end of a hollow shaft 67 or tube which may be of "lemon" section or provided with a rectangular bore. At its outer end the shaft 67 carries a guide sleeve 68 of frusto-conical shape for guiding into alignment the outer end of an implement shaft assembly 69 as described above. The sleeve and shaft are fully enclosed by a projecting shell formed from two telescopic sleeves 70, 71 of which the sleeve 70 is supported at its inner end on a bearing 72 located between the sleeve and the universal joint 66 and carries at its inner end an integral conical or semi-spherical sleeve 73 for protecting the universal joint. The sleeve 71 is supported at its outer end on a bearing 74 located between the sleeve and an axial portion 75 providing the mounting for the sleeve 68 on the sleeve 71. At the outer end of the sleeve 71 there is an integral conical or semi-spherical sleeve 76 for protecting the guide sleeve 68.

The shaft assembly is normally held in a fully extended position as shown in the drawing in which an outwardly directed annular flange 77 on the inner end of the sleeve 71 is held in engagement with an inwardly directed annular flange 78 on the outer end of the sleeve 70 by a spring 79 located between the telescopic members 65, 67 and the protecting shell. The spring engages at one end with the flange 77 and at the other end with an abutment ring 80 mounted on the protecting sleeve 70 adjacent to the universal joint.

When the implement is being hitched to the tractor the shaft 81 of the implement shaft assembly of complementary section to the bore of the shaft 67 is slidably received in the bore in the shaft 67 as described above with reference to the preceding embodiments. The sliding engagement between the shaft continues while the tractor is being reversed until an inclined annular abutment 82 on the implement shaft 81 engages with the outer end of the shaft 67. The tractor shaft assembly is then contracted against the force in the spring 79 by an amount required to enable the hitching operation to be completed. Means such as a key (not shown) are provided between the sleeve 65 and the hollow shaft 67 to prevent relative angular movement taking place between them.

In any of the forms of tractor shaft assembly described above with reference to FIGURES 3–12, the non-rotatable projecting sleeve may form a stationary guide for the outer end of the implement shaft assembly, the guide sleeve mounted on the outer end of the shaft or tube rotatable with the power take-off shaft of the tractor being omitted.

One embodiment of such an arrangement is illustrated in FIGURE 13 in which 85 is a sleeve welded at its inner end to the universal joint 86 of the tractor. At its outer end there is welded to the sleeve 85 a shaft 87 having a longitudinal bore 88 of rectangular section which is adapted to receive for power transmission the outer end of shaft connected to the universal joint of the implement. Alternatively, the bore and its co-operating shaft may be of "lemon" section or any section other than circular. The shaft 87 is rotatably mounted in a bearing 89 located in a sleeve member 90 on the outer end of which is bolted a frusto-conical sleeve 91 forming the guide for the outer end of the implement shaft assembly. The assembly is suspended from the tractor as illustrated in FIGURE 1 or FIGURE 2 by springs of which one end of each spring may be clamped between an annular flange 92 on the sleeve member 89 and a complementary annular flange 93 on the sleeve 90 which are bolted together. The sleeve member 89 and the conical sleeve 91 are held substantially stationary by the springs.

Thus the sleeve 91 conveniently forms a guide for the implement shaft assembly as well as protecting the end of the shaft 87 from danger to personnel.

The sleeve 85 to which the shaft 87 is welded and the universal joint are protected by an outer shell 94 mounted on a bearing 95 of which the inner shell is formed by an annular groove surface 96 on the universal joint. At its outer end the protecting shell is in engagement with an annular seal 98 housed within an annular recess 97 in the inner end of the sleeve member 90.

Our improved power coupling has the advantage that when an implement is hitched to a tractor by hitch members comprising co-operating frames as described with reference to FIGURE 1 and the implement is raised by an amount exceeding a predetermined value, by carefully choosing the lengths of the co-operating shafts of the shaft assemblies, they can be automatically disconnected thus disengaging the power drive to the implement. This has the advantage that the universal joints are protected against damage when their angle of drive exceeds a value determined by the relative angle between the tractor and the implement.

When the implement is hitched to the tractor as described with reference to FIGURE 2, and the tractor is driven round bends the main axes of the tractor and the implement in a substantially horizontal plane move out of alignment. The shaft of the implement shaft assembly enters the shaft of the tractor shaft assembly by an amount which increases with increase in the angle between the axes of the vehicle. When this angle exceeds a predetermined value it is desirable for the power coupling to be disengaged so that the universal joints are protected against damage. This is achieved in the arrangement described above with particular reference to FIGURES 4–7 by removing from the implement tube 48 for a predetermined length at or adjacent to its inner end the projections 51 so that when the tube 48 has entered the tube 40 of the tractor shaft assembly 20 by a further distance corresponding to this predetermined angle between the tractor and the implement, its projections are automatically disengaged from the recesses 52 in the inner surface of the wall of the tube 40.

Similarly, in the arrangement described above with reference to FIGURES 8–10 the shaft 59 of the implement shaft assembly for this predetermined length at or adjacent to its inner end is of circular or other convenient section of which the diameter or the largest diametric measurement is smaller than the sides of the rectangular bore of minimum length.

When the implement is a mower which is being towed by a tractor to which it is hitched by the arrangement shown in FIGURE 1 or 2, and the cutter bar strikes an obstruction and automatically "breaks-back," the power coupling is automatically disengaged thus relieving the system of any undue stresses. The power coupling is automatically re-connected when the cutter bar is returned to its normal operating position.

In the arrangements described above it is to be understood that the implement shaft assembly need not necessarily be suspended from the implement but can be propped or supported by a spring loaded fork or equivalent arrangement which holds the assembly in a desired position in which it can be engaged by the shaft assembly on the tractor.

Although we have referred in the specification and claims to the terms "tractor" and "implement" it is to be understood that these terms are to be construed as including any powered vehicle having a power take-off shaft or any device, machine, vehicle, or the like which is to be raised, lowered, towed or otherwise manouvred by the tractor and which is provided with a power drive shaft.

I claim:

1. In an automatic power coupling for a tractor having hitching means, a linkage movable in a generally up and down direction by operation of power means on the tractor and a power take-off shaft, and an implement having hitching means for co-operation with the tractor hitching means and a power drive shaft, the combination of a first shaft assembly adapted to be connected to said power take-off shaft through a first universal joint, a second shaft assembly for slidable coupling engagement with said first shaft assembly and adapted to be connected to said power drive shaft through a second universal joint, a suspension device comprising frame means mounted on said tractor linkage and movable with said linkage on operation of said power means, and resilient means suspending said first shaft assembly from said frame being so constructed and arranged that said first shaft assembly is movable in a generally up and down direction with said frame means to bring it into substantial alignment with said second shaft assembly prior to engagement of said shaft assemblies and that said first shaft assembly is permitted a free and unrestricted movement with said second shaft assembly when said shaft assemblies are in engagement, and means for maintaining said second shaft assembly in substantial alignment with said power drive shaft prior to engagement of said shaft assemblies.

2. The combination as claimed in claim 1, wherein said frame means comprises a hitch frame adapted to co-operate with a complementary hitch frame mounted on the implement.

3. The combination as claimed in claim 2, and further including resilient suspension means to suspend said implement shaft assembly from the hitch frame mounted on said implement, the resilient suspension means suspending said tractor and implement shaft assemblies each comprising springs.

4. In an automatic power coupling for a tractor having hitching means, a linkage movable in a generally up and down direction by operation of power means on the tractor and a power take-off shaft, and an implement having hitching means for co-operation with the tractor hitching means and a power drive shaft, the combination of a first shaft assembly adapted to be connected to said power take-off shaft through a first universal joint, a second shaft assembly for slidable coupling engagement with said first shaft assembly and adapted to be connected to said power drive shaft through a second universal joint, a suspension device comprising frame means mounted on said tractor linkage and movable with said linkage on operation of said power means, and resilient means suspending said first shaft assembly from said frame being so constructed and arranged that said first shaft assembly is movable in a generally up and down direction with said frame means to bring it into substantial alignment with said second shaft assembly prior to engagement of said shaft assemblies and that said first shaft assembly is permitted a free and unrestricted movement with said second shaft assembly when said shaft assemblies are in engagement, means for maintaining said second shaft assembly in substantial alignment with said power drive shaft prior to engagement of said shaft assemblies, each of said shaft assemblies embodying a shaft of which one shaft is of a section other than circular, and the other shaft has an axial bore of a section complementary to that of said one shaft in which said one shaft is adapted to be received slidably, and cam means incorporated in the shafts and co-operating during said sliding engagement to position said shafts in a predetermined angular relationship in which the universal joints are in phase.

5. The combination as claimed in claim 4, wherein said one shaft is of "lemon" section having on its outer surface a pair of diametrically opposed axially extending projections and the bore in said other shaft is of a complementary section having a pair of diametrically opposed axially extending recesses in which are slidably received said projections on said second shaft, cam surfaces on said other shaft formed by opposed inclined faces on the outer end of said shaft, and a pin fixed in the outer end of said one shaft and having opposite ends adapted to co-operate with said cam surfaces to position said shafts in said predetermined angular relationship in which the universal joints are in phase.

6. The combination as claimed in claim 4, wherein said one shaft is of rectangular section, and the bore in said other shaft in which said one shaft is slidably received is of a complementary rectangular section, cam surfaces on said other shaft formed by two diametrically opposed inclined faces on the outer end of the shaft of which the faces at their outer ends extend inwardly in opposite directions from axially extending recesses in substantially the centres of opposed sides of the bore of minimum width and terminate in the opposite axially extending recesses, a portion of substantially circular diameter substantially equal to the minimum dimension of said rectangular shaft formed on the outer end of said one shaft and in which is fixed a pin of which opposite ends project above the faces of the shaft of minimum width and with which are adapted to co-operate said cam surfaces whereby at least one of the shafts is moved angularly so that the shafts are positioned in a predetermined angular relationship in which the universal joints are in phase, and upon further relative sliding movement between the shafts said one shaft is received in said bore in said second shaft and the ends of the pin are received in said axially extending recesses in said first shaft.

7. In an automatic power coupling for a tractor having hitching means and a power take-off shaft, and an implement having hitching means for co-operation with the tractor hitching means, the combination of: a first shaft assembly comprising a first shaft for connection at its inner end to said power take-off shaft through a first universal joint, an outer protecting shell enclosing said first shaft and said first universal joint, and bearing means located between said first shaft and said protecting shell, a second shaft assembly comprising a second shaft for connection at its inner end to said power drive shaft, an outer protecting shell enclosing said second shaft and said second universal joint, and bearing means located between said second shaft and its protecting shell, one of said first and second shafts having an axial bore in which is slidably received the other of said shafts which is of a section complementary to said axial bore and which projects at its outer end from its protective shell, resilient means co-operating with the outer protecting shell of said first shaft assembly for suspending said first shaft assembly from a part of the tractor which is adapted to be raised and lowered by said power means whereby upon operation of said power means said first shaft is adapted to be positioned in substantial alignment with said second shaft, a conical sleeve on the outer end of the outer protecting shell of said first shaft assembly, and co-operating means for preventing relative angular movement between said shafts when slidably engaged.

8. The combination as claimed in claim 7, wherein the first shaft as said first shaft assembly comprises two telescopic sleeves of which the outer sleeve at its inner end is adapted to be secured to said first universal joint and the inner sleeve is provided with an axial bore for receiving the outer end of the shaft of said second shaft assembly, and said outer protecting shell of said first shaft assembly is formed from two telescopic members, bearings on which said telescopic sleeves are rotatably mounted, and a spring located in an annular space between said first shaft and its outer protecting shell and normally holding said shaft assembly in an extended position.

References Cited by the Examiner
UNITED STATES PATENTS

| | | | |
|---|---|---|---|
| 1,898,113 | 2/1933 | Zink | 180—14 |
| 1,926,935 | 9/1933 | Bottini | 180—14 |
| 2,696,089 | 12/1954 | Harrington | 180—14 X |
| 2,696,935 | 12/1954 | Heth | 180—14 X |
| 2,772,549 | 12/1956 | Harrington | 180—14 X |
| 2,785,549 | 3/1957 | Harrington | 180—14 X |
| 2,869,660 | 1/1959 | Miller et al. | 180—14 |
| 2,947,543 | 8/1960 | Raybould | 180—14 X |
| 3,014,545 | 12/1961 | Shepley | 180—14 |
| 3,074,501 | 1/1963 | Lane et al. | 180—14 |

MILTON BUCHLER, *Primary Examiner.*

BENJAMIN HERSH, *Examiner.*

C. C. PARSONS, *Assistant Examiner.*